Figure 1:
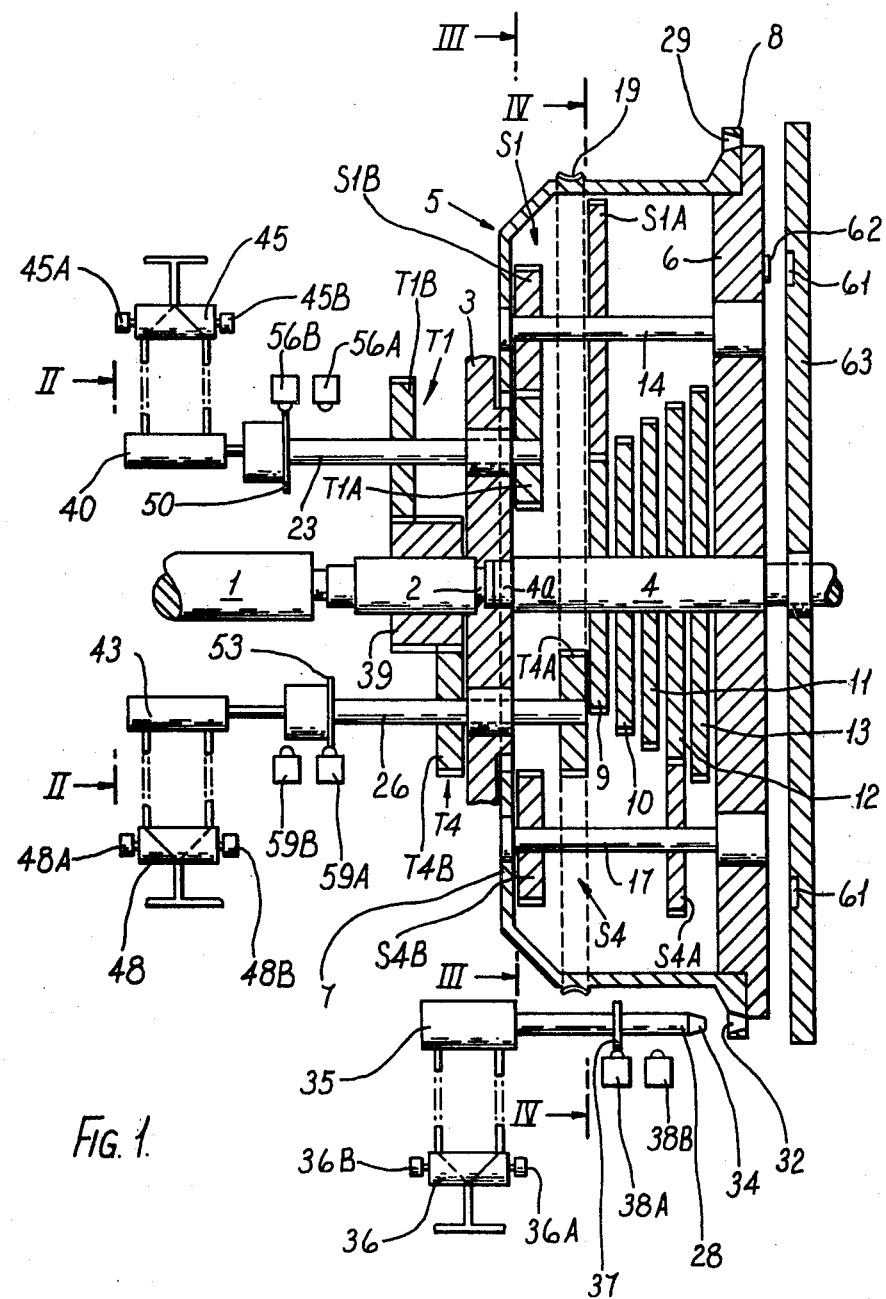

United States Patent [19]

Byrt et al.

[11] 4,173,905

[45] Nov. 13, 1979

[54] CHANGE-SPEED GEARBOXES

[75] Inventors: Graham A. B. Byrt; Douglas E. Riddler, both of Bristol, England

[73] Assignee: Masson Scott Thrissell Engineering, Ltd., United Kingdom

[21] Appl. No.: 807,603

[22] Filed: Jun. 17, 1977

[30] Foreign Application Priority Data

Jun. 29, 1976 [GB] United Kingdom ............... 27102/76

[51] Int. Cl.$^2$ .......................... F16H 3/08; F16H 3/22; B23Q 17/00; B23B 29/24

[52] U.S. Cl. ........................................ 74/356; 74/346; 74/826; 74/825; 74/813 C; 74/815

[58] Field of Search ................. 74/342, 343, 346, 356, 74/359, 369, 331, 825, 826, 813 R, 813 C, 813 L, 815, 816, 817, 818

[56] References Cited

U.S. PATENT DOCUMENTS

| | | | |
|---|---|---|---|
| 2,520,352 | 8/1950 | Wuetig | 74/342 X |
| 3,071,982 | 1/1963 | Beer | 74/359 |
| 3,264,903 | 8/1966 | Bonnafe | 74/825 |
| 3,367,200 | 2/1968 | Cummings | 74/342 X |
| 3,505,903 | 4/1970 | Grass | 74/359 X |
| 3,572,175 | 3/1971 | Deprez | 74/825 |
| 3,653,282 | 4/1972 | Bouffiou et al. | 74/826 X |

FOREIGN PATENT DOCUMENTS

1278554 6/1972 United Kingdom ..................... 74/816

*Primary Examiner*—Lance W. Chandler
*Attorney, Agent, or Firm*—Seidel, Gonda, Goldhammer & Panitch

[57] ABSTRACT

A change-speed gearbox has coaxial input and output shafts. Five intermediate shafts are equi-spaced around the input shaft and each has two gears fixed thereto, one of which meshes with a common gear on the input shaft, the intermediate shafts being movable axially.

Five gears of different diameters are fixed to the output shaft around which five secondary shafts are carried by a rotatable cage. The five secondary shafts each have two gears fixed thereto, one of which meshes with a different one of the gears on the output shaft.

Any one of a possible twenty five gear ratios between the input and output shafts may be obtained by rotating the cage until a selected one of the secondary shafts is in the same radial plane as a selected one of the intermediate shafts, that intermediate shaft then being moved axially to bring the second gear thereon into mesh with the second gear on the selected secondary shaft.

11 Claims, 5 Drawing Figures

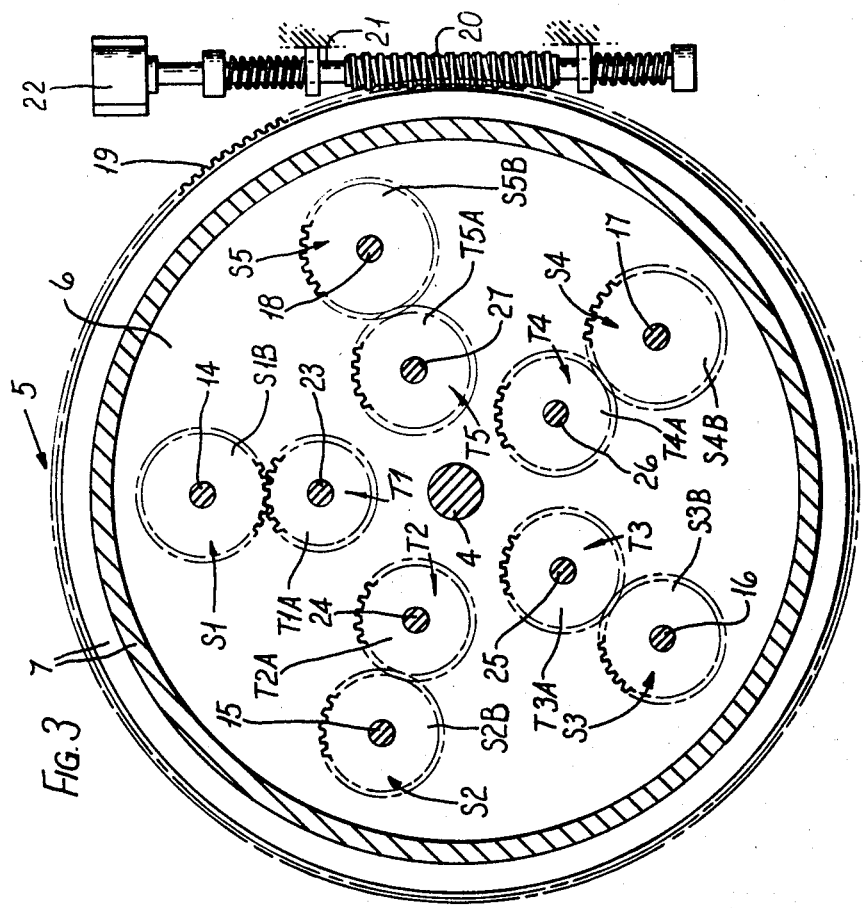
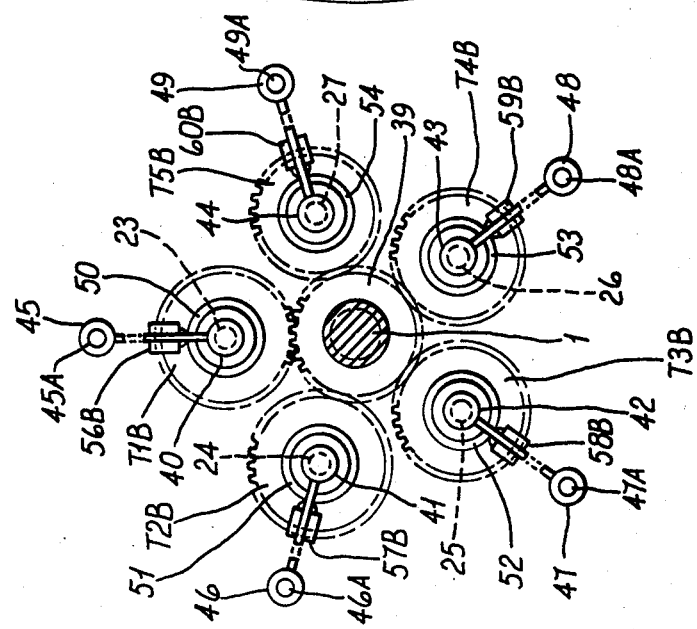

CHANGE-SPEED GEARBOXES

This invention concerns improvements in or relating to change-speed gearboxes, more specifically to such gearboxes providing a substantial number of alternative gear ratios between an input shaft and an output shaft.

A particular requirement for such a gear box arises in paper cutting machines for producing individual sheets from a continuous web. Such machines are often so arranged that the web is fed at a constant speed, while the frequency of operation of a cutting device is variable to permit alteration of the length of the sheets produced. Exact relative timing of the web feed and the cutting device is necessary to give constancy of sheet length, hence it is usual to provide a common drive, with some form of variable gearing for transmitting drive to the cutting device. Continuously variable ratios are obtainable with friction drive assemblies, but these are expensive and may slip under the intermittent loading that the cutting device of a paper cutting machine imposes during operation.

According to the present invention there is provided a change-speed gearbox comprising a first assembly including at least one gear train drivingly connected with a driving shaft, a second assembly including at least two gear trains each drivingly connected with a driven shaft, means for making a drive connection between a gear of any selected trains of the first assembly and a gear of the associated train of the second assembly to establish a driving connection between the driving and driven shafts, in which one of said assemblies of gear trains is carried on a movable support so that by movement of said support each gear train carried thereby may be brought into association with any one of the gear trains of the other assembly.

Preferably there are a plurality of gear trains in each of the two assemblies, and most conveniently the numbers of trains in the two asemblies are equal. The drive connection between gears of associated trains may be made by axial movement of one gear into mesh with the other, and the movable support is preferably rotatable.

More specifically, a change-speed gearbox embodying the invention may comprise coaxial input and output shafts, a fixed support and a rotatable support, a plurality of intermediate shafts rotatably carried by said fixed support, an equal number of secondary shafts rotatably carried by said rotatable support, both said intermediate and said secondary shafts being disposed around said coaxial shafts at regular angular spacings, each of said intermediate and of said secondary shafts having two gears rotatable therewith, a common input gear secured to said input shaft and permanently in mesh with one of the gears of each of the intermediate shafts, and equal number of output gears secured to said output shaft, each of said output gears being permanently in mesh with one of the gears on a different one of the secondary shafts, means for turning the rotatable support to bring one of the secondary shafts into the same radial plane as any selected one of the intermediate shafts, and means for moving the second gear on said one intermediate shaft into mesh with the second gear on the selected secondary shaft.

In a preferred arrangement the two gears on each of said intermediate shafts are secured to their shaft and said moving means moves said one intermediate shaft axially.

In such an arrangement, when the second gear on an intermediate shaft is meshed with the second gear on the selected secondary shaft, a drive connection is completed between the input and output shafts and the overall ratio of said connections is the product of two factors, one determined by the numbers of teeth on the gears on that intermediate shaft and on the common gear which together constitute one gear train, the other determined by the numbers of teeth on the gears on the selected secondary shaft and the associated output gear which together form another gear train. By arranging that all the gear trains carried by the fixed support provide different factors, and similarly all the gear trains on the rotatable support also provide different factors, each possible drive connection which can be established between the input and output shafts has a different overall ratio.

Figure 4:
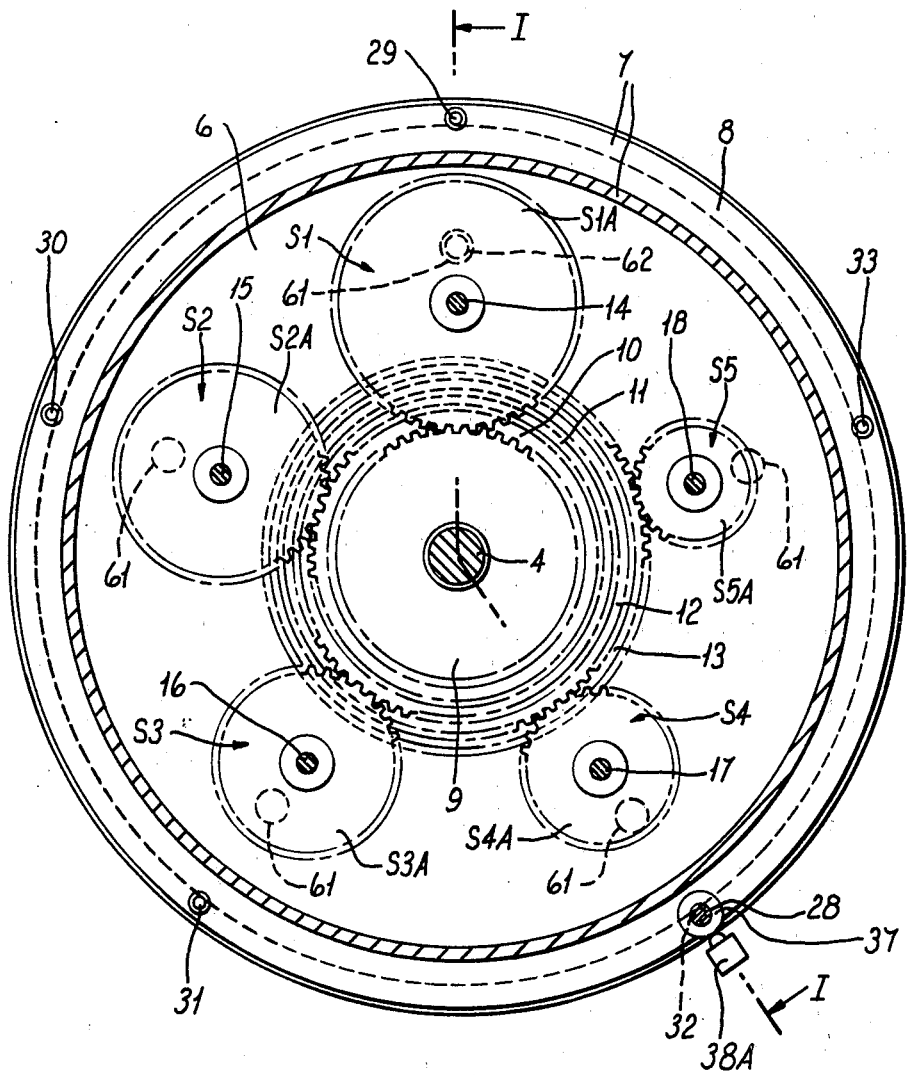
Figure 5:
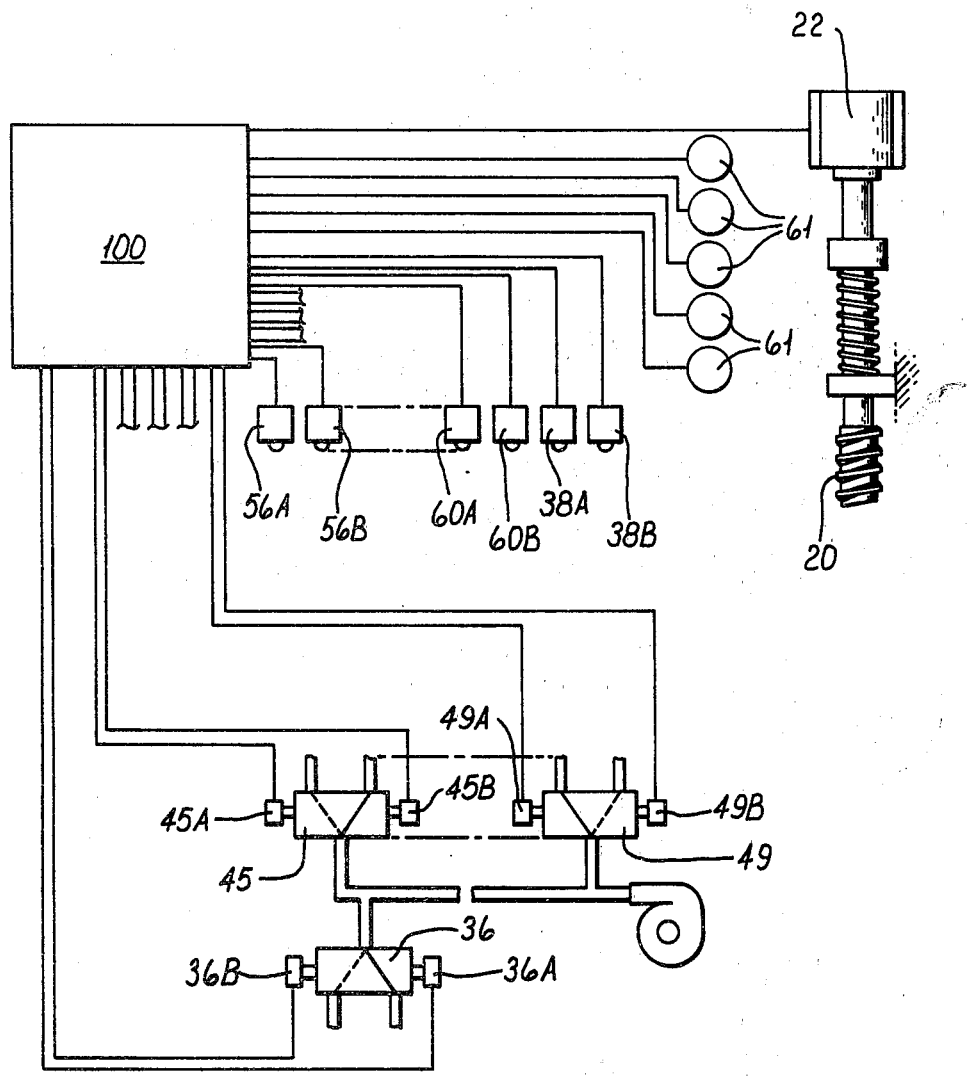

The invention will now be described, by way of example only, with reference to the accompanying drawings in which:

FIG. 1 is a diagrammatic cross sectional view of a gearbox, according to the present invention, the section being taken on the lines I—I of FIG. 4, FIG. 2 is a section taken on the line II—II of FIG. 1, FIG. 3 is a section taken on the line III—III of FIG. 1, FIG. 4 is a section taken on the line IV—IV of FIG. 1, and FIG. 5 is a diagram showing electrical and pneumatic connections enabling the gear box of FIG. 1 to be operated from an automatic control unit.

The gearbox of the present invention may conveniently be used as part of the drive of a machine for cutting a continuous paper web into individual sheets. An example of such use is shown and described in Application No. 46134/74 in which the gearbox 12 could conveniently be constructed and operated according to the present invention.

Referring now to the drawings, the gearbox comprises an input shaft 1, the right hand end (as viewed in FIG. 1) of which is rotatably supported at 2 in a fixed part 3 of the machine of which the gearbox forms a part. The shaft 1 extends to the left and is driven by an electric motor (not shown).

An output shaft 4 is also rotatably supported, at 4a, at its left hand end, in the fixed part 3, the shaft 4 being mounted in axial alignment with, but not connected to, the shaft 1. Mounted coaxially with the shaft 4, and supported for periodic rotation thereabout (as will be described later) in a fixed part of the machine (not shown), is a cage 5 which comprises a back plate 6 and a front cover 7 provided with an annular flange 8.

Fixed on the output shaft 4 are five helical gears 9–13 having 71, 81, 91, 100 and 108 teeth respectively. Five shafts 14–18 are carried in the cage 5, equispaced angularly round the shaft 4 and journalled at opposite ends in the plate 6 and cover 7, the shafts 14–18 being parallel to the shaft 4. Fixed respectively to the shafts 14–18 are five sets S1–S5 of helical gears, each set consisting of two gears, the latter being shown by the references S1A, S1B, S2A, S2B . . . S5A, S5B. The gears S1A–S5A have respectively 71, 61, 51, 42 and 34 teeth, and are arranged to be in constant mesh with the gears 9–13, as shown in FIG. 4. The gears S1B–S5B are all the same size each having 35 teeth.

Formed around the outside of the cover 7 are gear teeth 19 (FIGS. 1 and 3) which are arranged to mesh with a worm gear 20 (FIG. 3) fixed on a shaft 21 which is driven by a motor 22. The arrangement is thus such that energisation of motor 22 causes the cage 5 to rotate about the axis of the shaft 4, the sets S1–S5 of gears also being carried bodily round with the cage. However, when the cage is moved, it is always moved an integral number of fifths of a revolution, so that on stopping each of the shafts 14–18 has its axis in a plane defined by the axes of shaft 4 and one of five further shafts 23–27, which are also equispaced angularly round the shaft 4. The cage then has five possible positions and when it is stopped in any one of these positions, it is locked in that position by insertion of a locking pin 28 in one of five holes 29–33 in the flange 8. The pin 28 has a tapered end 34 and the holes 29–33 each have a matching taper so that, if rotation of the cage by the motor 22 does not bring the cage exactly to a desired position, subsequent insertion of the pin 28 in the appropriate one of holes 29–33 will bring the cage exactly to the desired location, by cam or wedge action between the tapered surfaces. The pin 28 is longitudinally slidable in supports (not shown) and is urged towards and away from the flange 8 as necessary by a double-acting pneumatic cylinder 35 supplied with compressed air via a change-over valve 36. The valve 36 is operated by solenoids 36A, 36B. The pin 28 is provided with a collar 37 which engages and operates a microswitch 38A when the pin 28 is disengaged from the flange 8, or a microswitch 38B when the pin 28 is inserted in one of the holes 29–33.

The further shafts 23–27 already mentioned are all journalled in the fixed part 3 and are axially slidable as well as rotatable. Each of the shafts 23–27 has respectively a set T1–T5 of two gears secured to it, one being inside the cage 5 and the other outside it; the gears within the cage on said shafts 23–27 are respectively identified as T1A–T5A and have 32, 33, 34, 35 and 36 teeth, and those outside correspondingly are T1B–T5B having 40, 39, 38, 37 and 36 teeth. The gears T1B–T5B are all in constant mesh with a common input gear 39 secured to the input shaft 1 and having 35 teeth, the gear 39 being of sufficient axial length to allow for the axial movement of the shafts 23–27 (and hence of gears T1B–T5B). The axial movement of the shafts 23–27 is produced by pneumatic cylinders 40–44, associated with change-over valves 45–49 operated by solenoids, 45A, 45B–49A, 49B, and the shafts 23–27 respectively carry collars 50–54 operating microswitches 56A, 56B–60A, 60B.

It will be appreciated that the drawings show cylinders 35, 40–44 and valves 36, 45–49 in a diagrammatic manner; for example no indication is included of the air exhaust ports that would obviously be needed for well-known reasons.

Any selected one of the gears T1A–T5A may be placed in mesh with the adjacent one of the gears S1B–S5B, by moving to the left (as seen in FIG. 1) whichever one of the shafts 23–27 carries the selected gear. As shown in FIG. 1, shaft 23 has been moved to the left, hence gear T1A is in mesh with gear S1B. Drive can therefore be transmitted from the shaft 1 via gear 39, gear T1B, shaft 23, gear T1A, gear S1B, shaft 14, gear S1A, and gear 9 to shaft 4. The overall gear ratio thus provided is therefore (using the reference for each gear as meaning the number of teeth on that gear):

$$\frac{39}{T1B} \times \frac{T1A}{S1B} \times \frac{S1A}{9}$$

If a different one of the shafts 23–27 is moved to the left, a drive connection of different ratio is established. Thus if shaft 26 is moved to the left to mesh gear T4A with gear S4B, the overall gear ratio is:

$$\frac{39}{T4B} \times \frac{T4A}{S4B} \times \frac{S4A}{12}$$

By selection of one of the shafts 23–27 for movement to the left, with cage 5 in the position shown, a choice of five overall gear ratios is available. By rotation the cage 5 may however be placed in any one of five positions, and for each of these positions another five ratios are available so that in all the gearbox illustrated offers a choice of twenty-five ratios. For example, if the cage is so placed that shaft 26 is in the same radial plane as shaft 14, and the shaft 26 is then moved to the left (as seen in FIG. 1) to bring gear T4A into mesh with gear S1B, the overall gear ratio obtained is:

$$\frac{39}{T4B} \times \frac{T4A}{S1B} \times \frac{S1A}{9}$$

To allow the cage 5 to be turned and the gears T1A–T5A to mesh correctly with gears S1B–S5B in each of the five positions of the cage, it will be apparent that it is a practical necessity for there to be the same radial distance from the common axis of shafts 1 and 4 to each of the positions at which the gears S1B–S5B mesh with gears T1A–T5A. Conveniently in this embodiment of the invention all the five gears S1B–S5B have the same number of teeth, and shafts 23–27 are mounted at different radial distances from the axis of shafts 1 and 4 depending on the numbers of teeth chosen for the gears T1A–T5A and T1B–T5B. (An alternative arrangement could be made by having all the shafts 23–27 at the same radial distance from shafts 1 and 4, all the gears T1A–T5A with the same number of teeth, and the shafts 14–18 at different radial distances from the axis of shafts 1 and 4).

The selection of a desired overall ratio from the twenty-five available thus requires two settings to be made; first the cage 5 has to be placed in the appropriate one of its five possible positions and then one only of the shafts 23–27 has to be moved (to the left as seen in FIG. 1) to engage one of the gears T1A–T5A with whichever of the gears S1B–S5B is adjacent to it. Whenever the cage 5 is rotated to a different position, all the shafts 23–27 must be in their right-hand (as seen in FIG. 1) positions, so that gears T1A–T5A and S1B–S5B do not engage as the cage 5 turns.

While the energisation of the solenoids of the various pneumatic valves and of the motor 22 may be individually controlled by an operator, it is preferred that said solenoids and motor are all connected to a common control unit 100 (FIG. 5), which may be of any convenient known type, the switches 38A, 38B, and 56A, 56B–60A, 60B also being connected to the control unit which contains electrical circuits whereby the various functions—rotation of cage 5, axial movement of shafts 23–27 and of pin 28—are performed in correct sequence whenever required, notably in changing from one gear ratio to a different one. Such electrical circuits may constitute a form of program controller, with electrical interlocks so that the individual steps of an operation are performed in correct order and no step is initiated until the condition of the relevant sensing switches indicate proper completion of the preceding step. An important factor in such control is the correct positioning of cage 5 when the latter has been rotated and for checking this there are provided fixed proximity detectors 61 (FIGS. 1, 4 and 5), of any convenient known type, which cooperate with a datum marker 62 attached to the back plate 6 of cage 5. The proximity detectors 61 are mounted on fixed member 63 (FIG. 1) in such positions that a different one of them lies in the same radial plane as each of the further shafts 23–27, as illustrated in FIG. 4. Each of the detectors 61 is connected to the control unit 100, as shown in FIG. 5 so that any particular detector may be activated by a signal from the unit 100. Prior to the cage 5 being rotated, as previously described, a signal from control unit 100 activates that detector 61 which will cause the cage 5 to come to rest (which occurs when the datum marker 62 is opposite the activated detector 61) with the selected one of gears S1B–S5B in alignment with the selected one of gears T1A–T5A.

Although in the foregoing description the shafts 1, 4 are described respectively as the input and output shafts of the gearbox, it should be noted that they could equally well be used in the reverse mode, i.e. shaft 4 is the input shaft and shaft 1 is the output shaft.

We claim:

1. A change speed gear box comprising an input shaft, an output shaft, a fixed support, a movable support, a plurality of intermediate shafts rotatably carried by said fixed support, a plurality of secondary shafts rotatably carried by said movable support, two gears carried on each of said intermediate and on each of said secondary shafts and rotatable therewith, a common input gear secured to said input shaft and permanently in mesh with one of the gears of each of the intermediate shafts, a plurality of output gears secured to said output shaft with the number of such output gears being equal to the number of secondary shafts, each of said output gears being permanently in mesh with one of the gears on a different one of the secondary shafts, means for displacing the movable support to bring one of the secondary shafts adjacent to any selected one of the intermediate shafts to move the second gear on said one intermediate shaft into meshable alignment with the second gear on the selected secondary shaft, and means for subsequently moving one of said aligned second gears into mesh with the other.

2. A change-speed gearbox as claimed in claim 1 in which the two gears on each of said intermediate shafts are secured to their respective shaft and said moving means moves said one intermediate shaft axially.

3. A change-speed gearbox as claimed in claim 2 further comprising means for selectively locking said movable support against movement with any selected one of said secondary shafts in the same radial plane as any selected one of said intermediate shafts.

4. A change-speed gearbox as claimed in claim 3 in which said locking means comprises a pin, a plurality of holes provided in said movable support and means for inserting said pin into one of said holes.

5. A change-speed gearbox as claimed in claim 4 in which said moving means and said inserting means each include a pneumatic cylinder and wherein such moving means is provided for each of said intermediate shafts.

6. A change-speed gearbox as claimed in claim 5 in which said turning means comprises an electric motor, a worm gear driven by said motor, and gear teeth, adapted to engage with said worm gear, formed on said movable support.

7. A change-speed gearbox as claimed in claim 6 further comprising a plurality of solenoid operated change-over valves, one such valve being connected to each of said moving means and to said inserting means, a plurality of solenoids adpated to operate said change-over valves, switch means associated with each of said intermediate shafts and with said pin, and adapted to indicate the limits of movement thereof, a collar mounted on each of said intermediate shafts and on said pin for operating said switch means, and a control unit connected to each of said switch means, to each of said solenoids and to said electric motor so that the various operations required to change the ratio of the speeds of said input and output shafts are carried out automatically in the correct sequence.

8. A change-speed gearbox as claimed in claim 7 further comprising a plurality of detector means fixedly mounted adjacent said movable support and each connected to said control unit, a datum marker mounted on said movable support so that said datum marker passes over each of said detector means in succession, said control unit being adapted to generate a signal to activate a selected one of said detector means whereby said movable support is brought to rest when said one of said detector means detects the presence of said datum mark.

9. A change speed gear box as claimed in claim 1 in which said movable support is a rotatable support.

10. A change speed gear box as claimed in claim 9 in which said input and output shafts are in axial alignment, both said intermediate and said secondary shafts being disposed around said coaxial shafts at regular angular spacings.

11. A change speed gear box as claimed in claim 10 in which the displacing means comprises means for turning the rotatable support to bring one of the secondary shafts into the same radial plane as any selected one of the intermediate shafts.

* * * * *